(12) United States Patent
Cai et al.

(10) Patent No.: US 12,579,622 B2
(45) Date of Patent: Mar. 17, 2026

(54) METHOD AND APPARATUS FOR PROCESSING IMAGE SIGNAL, ELECTRONIC DEVICE, AND COMPUTER-READABLE STORAGE MEDIUM

(71) Applicant: Tencent Technology (Shenzhen) Company Limited, Shenzhen (CN)

(72) Inventors: Kunjing Cai, Shenzhen (CN); Huan Liu, Shenzhen (CN); Yichen Huang, Shenzhen (CN); Enpeng Xue, Shenzhen (CN); Zhengli Chen, Shenzhen (CN); Kexin Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 446 days.

(21) Appl. No.: 17/973,627

(22) Filed: Oct. 26, 2022

(65) Prior Publication Data

US 2023/0048147 A1 Feb. 16, 2023

Related U.S. Application Data

(63) Continuation of application No. PCT/CN2021/135149, filed on Dec. 2, 2021.

(30) Foreign Application Priority Data

Dec. 25, 2020 (CN) .......................... 202011566800.1

(51) Int. Cl.
 *G06T 5/77* (2024.01)
 *G06T 5/50* (2006.01)
 (Continued)

(52) U.S. Cl.
 CPC .................. *G06T 5/77* (2024.01); *G06T 5/50* (2013.01); *G06T 7/70* (2017.01); *G06V 10/40* (2022.01);
 (Continued)

(58) Field of Classification Search
 CPC .... G06T 5/77; G06T 7/70; G06T 5/50; G06T 2207/20084; G06T 2207/20221;
 (Continued)

(56) References Cited

U.S. PATENT DOCUMENTS

2020/0192612 A1 6/2020 Mori
2020/0279358 A1* 9/2020 Li .......................... G06T 7/0002
 (Continued)

FOREIGN PATENT DOCUMENTS

CN 109598689 A 4/2019
CN 109983501 A 7/2019
 (Continued)

OTHER PUBLICATIONS

Ren, Shaoqing. "Faster r-cnn: Towards real-time object detection with region proposal networks." arXiv preprint arXiv:1506.01497 (2015) (Year: 2016).*
 (Continued)

*Primary Examiner* — Oneal R Mistry
*Assistant Examiner* — Nhut Huy Pham
(74) *Attorney, Agent, or Firm* — Sughrue Mion, PLLC

(57) ABSTRACT

A method and apparatus for processing an image signal, an electronic device, and a computer-readable storage medium. The method includes: obtaining a digital image signal of a target image, the target image including object imaging corresponding to an object, identifying a first area of the object imaging in the target image from the digital image signal, removing the object imaging from the target image based on the first area, to obtain a background image (Continued)

corresponding to an original background, performing image inpainting processing on the first area of the background image to obtain a filled image, the filled image including the original background and a perspective background connected to the original background, identifying a second area in the object imaging, and removing an imaging portion corresponding to the second area from the object imaging, and superimposing the obtained adjusted object imaging on the first area.

20 Claims, 11 Drawing Sheets

(51) Int. Cl.
    *G06T 7/70*         (2017.01)
    *G06V 10/40*       (2022.01)
    *G06V 10/764*    (2022.01)
    *G06V 10/82*      (2022.01)
    *G06V 40/16*      (2022.01)
(52) U.S. Cl.
    CPC ............ *G06V 10/764* (2022.01); *G06V 10/82* (2022.01); *G06V 40/161* (2022.01); *G06T 2207/20084* (2013.01); *G06T 2207/20221* (2013.01); *G06T 2207/30201* (2013.01)
(58) Field of Classification Search
    CPC .......... G06T 2207/30201; G06V 10/40; G06V 10/82; G06V 40/161; G06V 10/764
    See application file for complete search history.

(56) References Cited

U.S. PATENT DOCUMENTS

| | | | | |
|---|---|---|---|---|
| 2021/0004940 | A1* | 1/2021 | Qin | ............................ G06T 5/20 |
| 2021/0383242 | A1* | 12/2021 | Ostyakov | ................ G06T 7/194 |
| 2022/0121839 | A1* | 4/2022 | Tagra | .................... G06V 40/172 |
| 2023/0153955 | A1* | 5/2023 | Ebihara | ...................... G06T 7/12 |
| | | | | 382/264 |

FOREIGN PATENT DOCUMENTS

| | | | | |
|---|---|---|---|---|
| CN | 109993089 | A | | 7/2019 |
| CN | 110135195 | A | | 8/2019 |
| CN | 110503097 | A | | 11/2019 |
| CN | 110544214 | A | | 12/2019 |
| CN | 110933299 | A | | 3/2020 |
| CN | 111325699 | A | | 6/2020 |
| CN | 112581567 | A | | 3/2021 |
| JP | 2020098422 | A | * | 6/2020 |

OTHER PUBLICATIONS

Ren, Shaoqing. "Faster r-cnn: Towards real-time object detection with region proposal networks." arXiv:1506.01497 (Year: 2015).*
International Search Report for PCT/CN2021/135149 dated Feb. 22, 2022.
Written Opinion for PCT/CN2021/135149 dated Feb. 22, 2022.

* cited by examiner

110

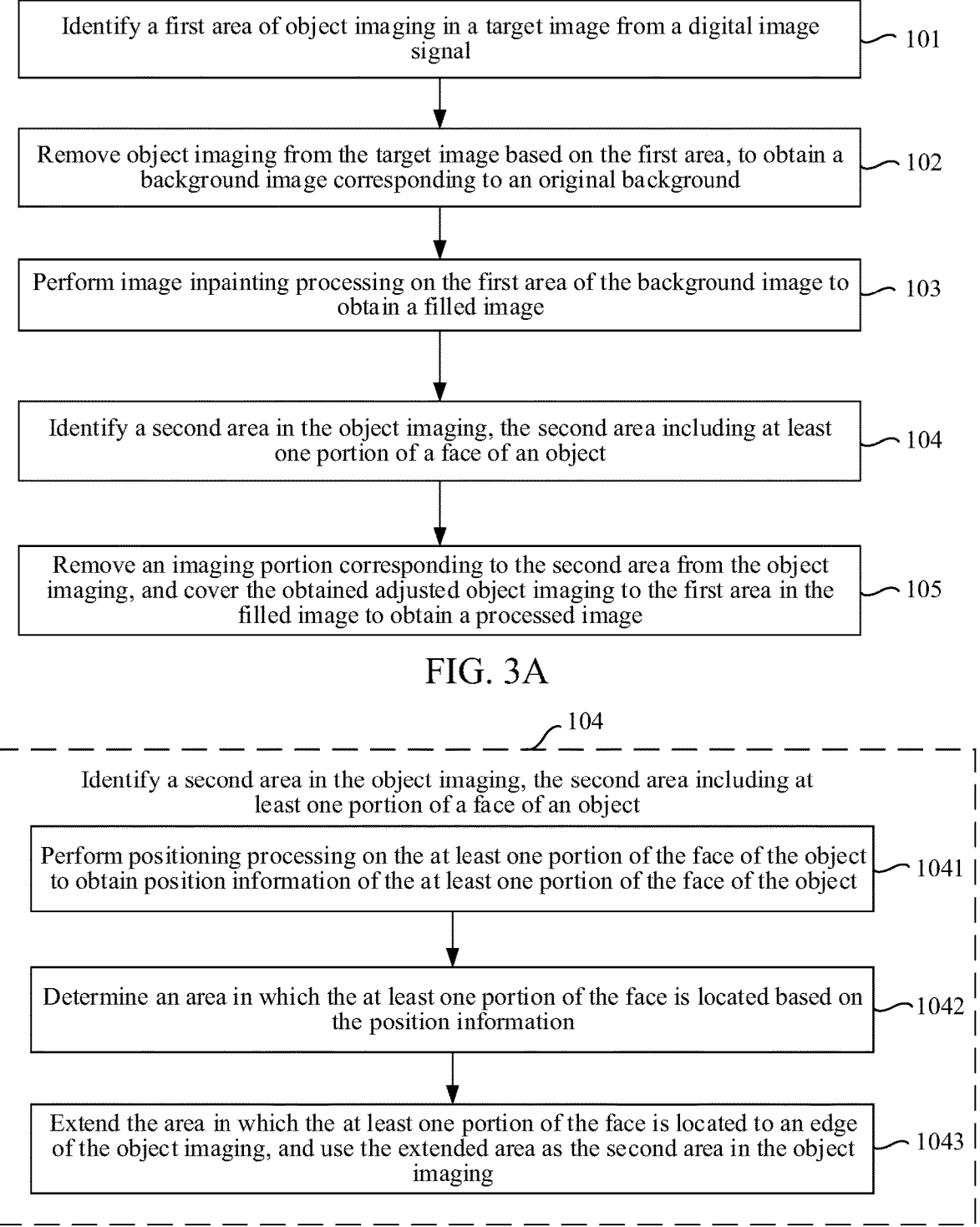

Identify a first area of object imaging in a target image from a digital image signal ⟋ 101

Remove object imaging from the target image based on the first area, to obtain a background image corresponding to an original background ⟋ 102

Perform image inpainting processing on the first area of the background image to obtain a filled image ⟋ 103

Identify a second area in the object imaging, the second area including at least one portion of a face of an object ⟋ 104

Remove an imaging portion corresponding to the second area from the object imaging, and cover the obtained adjusted object imaging to the first area in the filled image to obtain a processed image ⟋ 105

Identify a second area in the object imaging, the second area including at least one portion of a face of an object Perform positioning processing on the at least one portion of the face of the object to obtain position information of the at least one portion of the face of the object ⟋ 1041

Determine an area in which the at least one portion of the face is located based on the position information ⟋ 1042

Extend the area in which the at least one portion of the face is located to an edge of the object imaging, and use the extended area as the second area in the object imaging ⟋ 1043

FIG. 3B

Display a target image to be shared to a social network in response to an image selection operation    ~ 201

Obtain a processed image in response to a perspective processing operation on the target image, and display the processed image    ~ 202

Transmit the processed image to the social network in response to a sharing operation on the processed image    ~ 203

FIG. 3C

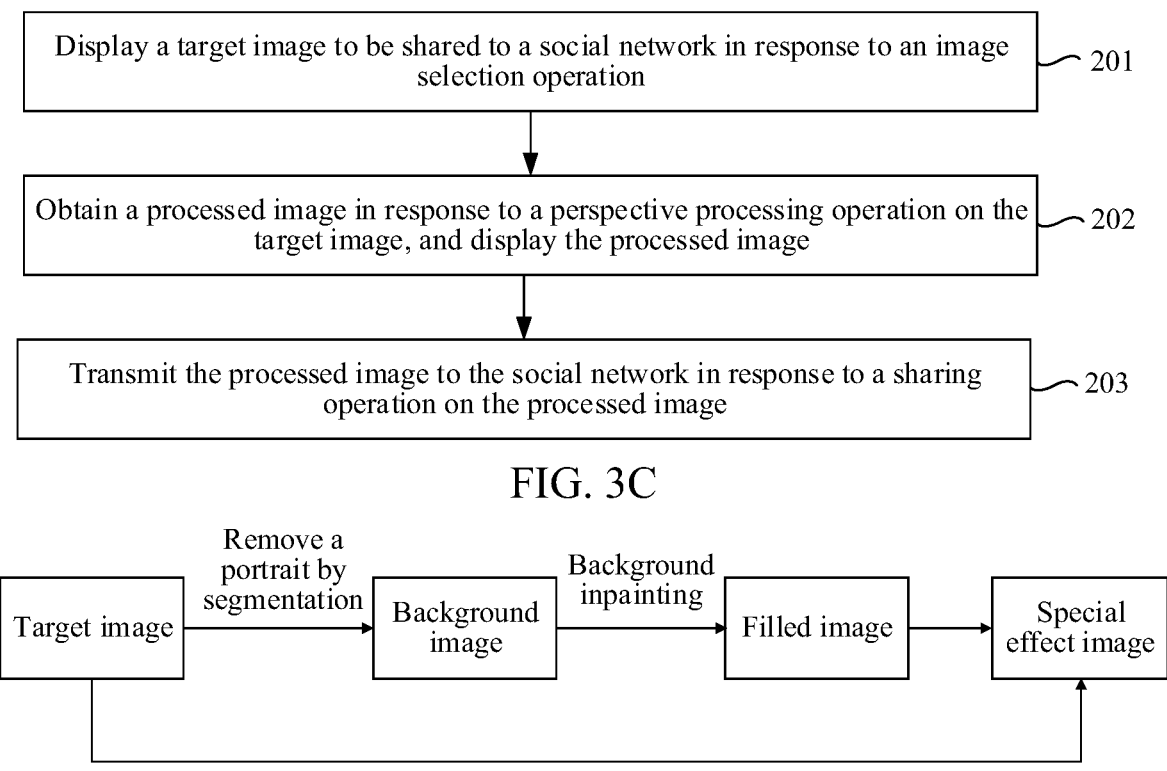

Detect key points of the face, to determine a perspective area

FIG. 4

Server 200 —

Memory 240

Operating system 241

Network communication module 242

Image processing apparatus 243

Identification module 2431

Filling module 2432

Training module 2433

Network interface 220

Processor 210

METHOD AND APPARATUS FOR PROCESSING IMAGE SIGNAL, ELECTRONIC DEVICE, AND COMPUTER-READABLE STORAGE MEDIUM

CROSS-REFERENCE TO RELATED APPLICATION(S)

This application is a continuation application of International Application No. PCT/CN2021/135149, filed on Dec. 2, 2021, which claims priority to Chinese Patent Application No. 202011566800.1, filed with the China National Intellectual Property Administration on Dec. 25, 2020, the discloses of which are incorporated by reference in their entireties.

FIELD

The disclosure relates to image processing technologies, and in particular, to a method and apparatus for processing an image signal, an electronic device, a computer program product, and a computer-readable storage medium.

BACKGROUND

Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result.

With the widespread use of social applications, it is increasingly important to handle privacy protection before image sharing. Typically, a face portion of an image to be shared by a user can be processed to hide identity information and protect user privacy. However, after the face image is processed (for example, mosaic processing) in the related art, mosaics cannot represent an effective information amount. Therefore, although the processed image can provide a privacy protection function for the user, an effective information amount included in the processed image is significantly reduced, which is equivalent to forming an information loss in a process of processing an image signal, resulting in the waste of image storage resources and image display resources of an electronic device.

SUMMARY

Some embodiments may provide a method and apparatus for processing an image signal, an electronic device, a computer program product, and computer-readable storage medium, which can realize object anonymization, reduce the loss of an image information amount, thereby maximally restoring the integrity, coordination, and accuracy of an information amount of the target image.

The technical solutions of the embodiments are implemented as follows:

Some embodiments may provide a method for processing an image signal, including: obtaining a digital image signal of a target image, the target image including object imaging corresponding to an object; identifying a first area of the object imaging in the target image from the digital image signal; removing the object imaging from the target image based on the first area, to obtain a background image corresponding to an original background; performing image inpainting processing on the first area of the background image to obtain a filled image, the filled image including the original background and a perspective background connected to the original background; identifying a second area in the object imaging, the second area including at least one portion of a face of the object; and removing an imaging portion corresponding to the second area from the object imaging, and filling the obtained adjusted object imaging into the first area in the filled image to obtain a processed image, the second area being perspective in the processed image.

Some embodiments may provide an apparatus for processing an image signal, including: an identification module, configured to obtain a digital image signal of a target image, the target image including object imaging corresponding to an object; identify a first area of the object imaging in the target image from the digital image signal; remove the object imaging from the target image based on the first area, to obtain a background image corresponding to the original background; and identify a second area in the object imaging, the second area including at least one portion of a face of the object; and a filling module, configured to perform image inpainting processing on the first area of the background image to obtain a filled image, the filled image including the original background and a perspective background connected to the original background; and remove an imaging portion corresponding to the second area from the object imaging, and fill the obtained adjusted object imaging into the first area in the filled image to obtain a processed image, the second area being perspective in the processed image.

Some embodiments may provide an electronic device, including: a memory, configured to store executable instructions; and a processor, configured to implement, when executing the executable instructions stored in the memory, the method for processing an image signal provided in some embodiments.

Some embodiments may provide a computer-readable storage medium storing executable instructions, the executable instructions, when executed by a processor, implementing the method for processing an image signal provided in some embodiments.

Some embodiments may provide a computer program product, including a computer program, the computer program, when executed by a processor, implementing the method for processing an image signal provided in some embodiments.

The embodiments of this disclosure have the following beneficial effects:

In some embodiments, a second area in which at least one portion of a face of an object of a target image is positioned, an imaging portion corresponding to the second area is removed from object imaging, the obtained adjusted object imaging is superimposed on a filled image obtained by filling processing to obtain a processed image, and the at least one portion of the face of the object is replaced with a perspective background connected to an original background. In this way, when the facial privacy protection of the image is realized so that object anonymization is realized, the loss of an image information amount is reduced, thereby maximally restoring the integrity, coordination, and accuracy of an information amount of the target image. Moreover, pixel units corresponding to the at least one portion of the face of the object are continuously used for displaying image information after completing the foregoing replacement, so that image storage resources and image display resources of an electronic device are effectively utilized, thereby improving the utilization rates of the image storage resources and the image display resources. In addition, the method of some embodiments can also superimpose the obtained adjusted object imaging on the filled image obtained by filling processing through the electronic device. Therefore, the accuracy of processing a digital image signal to realize object anonymization is also effectively improved compared with the related art.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

FIG. 3A is a schematic flowchart of a method for processing an image signal according to some embodiments.

FIG. 3B is a schematic flowchart of a method for processing an image signal according to some embodiments.

FIG. 3C is a schematic flowchart of a method for processing an image signal according to some embodiments.

FIG. 4 is a schematic flowchart of perspective processing according to some embodiments.

FIG. 5A is a schematic structural diagram of a server 200 according to some embodiments.

DESCRIPTION OF EMBODIMENTS

Figure 1:
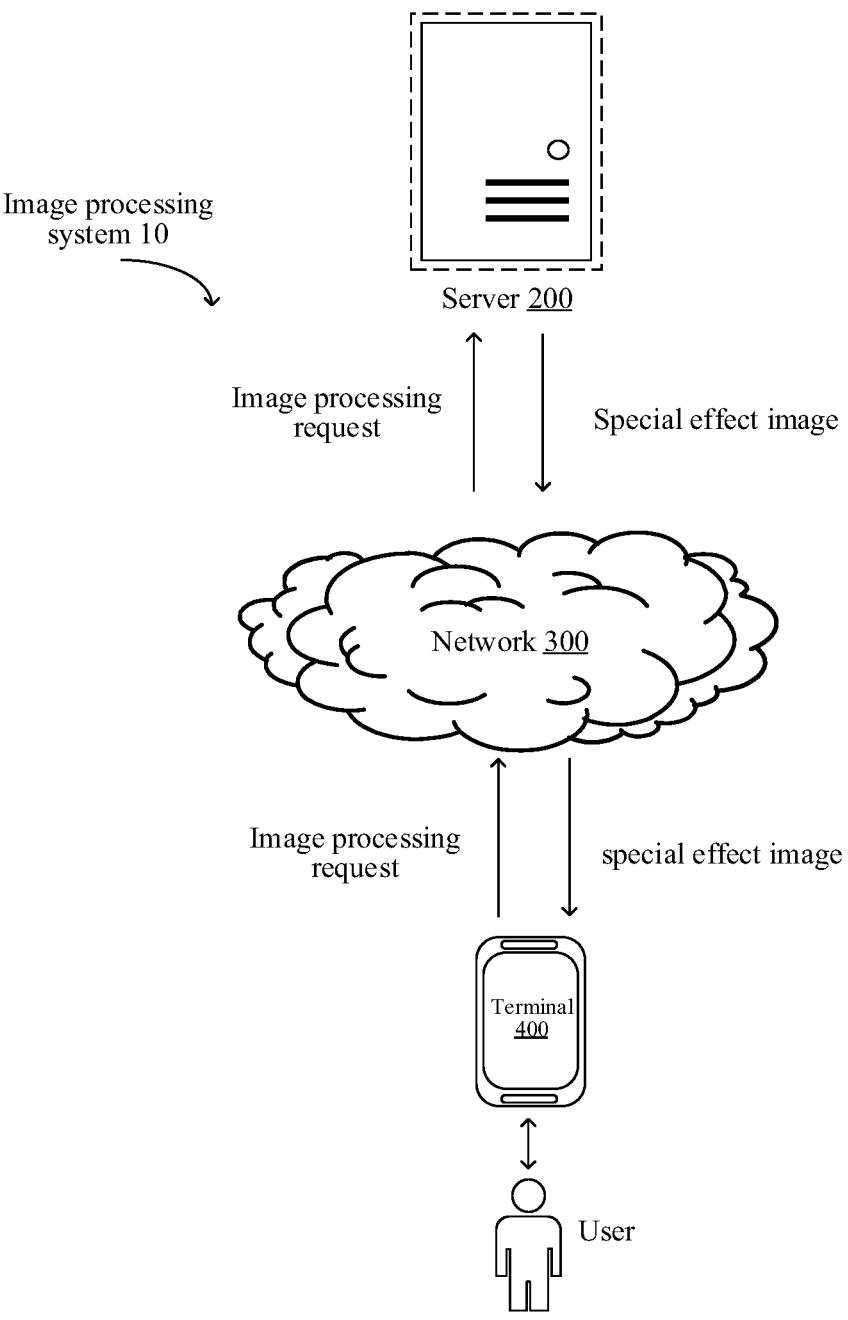
FIG. 1 is a schematic diagram of an architecture of an image signal processing system 10 according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

Unless otherwise defined, meanings of all technical and scientific terms used in this specification are the same as those usually understood by a person skilled in the art to which the disclosure belongs. Terms used in this specification are merely intended to describe objectives of the embodiments, but are not intended to limit thereto.

Before the embodiments are further described in detail, nouns and terms involved in some embodiments are described. The nouns and terms provided in some embodiments are applicable to the following explanations.

1) Perspective: cutting out some areas in an image, and filling the cut-out area with a background connected to an original background to achieve a perspective effect.

2) Object imaging: an object imaging portion opposite to a background portion in an image, such as portrait imaging, car imaging, house imaging, or the like.

3) Background image: an image after object imaging is removed.

4) Filled image: replacing object imaging in an image with a perspective background connected to an original background, to obtain an image only with a background portion and without the object imaging, such as an image of the sea, the forest, or the snow-capped mountains.

5) Image segmentation: a process of dividing an image into specific areas with unique properties and determining an interested area.

6) Texture: a visual feature that reflects a homogeneous phenomenon in an image, which reflects a slowly or periodically changed surface structure and arrangement property of a surface of an object. Local texture information is represented by pixels and gray scale distribution of surrounding spatial adjacent domains. Different degrees of repetition of local texture information form global texture information. Therefore, a texture feature not only reflects a property of a global feature, but also describes a surface property of a scene corresponding to an entire image or image area.

7) Image matting: separating a part of an image or video from an original image or video into a separate layer.

8) Generative adversarial network model: a, including a generator and a discriminator. The generator and discriminator contest each other, to generate a high-performance output. The discriminator performs classification prediction based on an input variable, and the generator randomly generates observation data based on given implicit information.

9) Special effect: the special effect refers to a thing that exists or does not exist in reality simulated in a video by using the computer technology. The special effect generally includes a sound special effect and a visual special effect.

10) Image inpainting: an image signal processing algorithm, which fills a missing area of a to-be-restored image according to the image or image library information, so that the integrity and coordination of the restored image is restored, and the image is difficult to be distinguished from an undamaged image. The image inpainting algorithm is divided into two categories: One is a texture synthesis algorithm, and a core thereof is to sample pixel blocks from the undamaged area of the image to fill a to-be-filled area. The other is that a neural network-based generative model encodes an image into a feature of high-dimensional latent space, and then decodes this feature into a restored full image.

In terminal applications, with the widespread use of social applications, it is increasingly important to handle privacy protection processing before image sharing, especially in social applications (such as for sharing clothes and outfits), a user generally intends to communicate with other users without looking at his face, for example, posting daily updates that cover his face to show personal outfits and interests, and to connect with others. In the related art, the user can select a sticker and move the sticker to a position required to be blocked in the image, or use a graffiti tool to doodle a portion of the image, or perform mosaic processing on a face image to achieve the purpose of blocking. However, after the face image is processed in the related art, the sticker or mosaic cannot represent effective information. Therefore, although the processed image can provide privacy protection function for the user, an effective information amount included in the processed image is significantly reduced, which is equivalent to forming an information loss in a process of processing an image signal, resulting in the waste of image storage resources and image display resources of an electronic device.

In a method for processing an image signal provided in the embodiments, at least one portion of a face of an object can be replaced with a perspective background connected to an original background. In this way, when the facial privacy protection of the image is realized so that object anonymization is realized, the loss of an image information amount is reduced, thereby maximally restoring the integrity, coordination, and accuracy of an information amount of the target image. Moreover, pixel units corresponding to the at least one portion of the face of the object are continuously used for displaying image information after completing the foregoing replacement, so that image storage resources and image display resources of an electronic device are effectively utilized, thereby improving the utilization rates of the image storage resources and the image display resources. In addition, the method of the embodiments can also superimpose the obtained adjusted object imaging on the filled image obtained by filling processing through the electronic device. Therefore, the accuracy of processing a digital image signal to realize object anonymization is also effectively improved compared with the related art.

The method for processing an image signal provided some embodiments may be implemented by various electronic devices, for example, may be implemented by a terminal independently, or may be implemented by a server and a terminal cooperatively. For example, the terminal is independently responsible for the method for processing an image signal described below, or the terminal transmits an image processing request to the server, and the server performs the method for processing an image signal according to the received image processing request.

An electronic device for image signal processing provided in some embodiments may be various types of terminal devices or servers, where the server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform; The terminal may be a tablet computer, a notebook computer, a desktop computer, or the like, but is not limited thereto. The terminal and the server may be directly or indirectly connected in a wired or wireless communication manner. This is not limited therein.

By using a server as an example, the server can be a server cluster deployed in the cloud to open artificial intelligence cloud services (AIaaS, AI as a Service) to users. The AIaaS platform splits several types of common AI services and provides independent services or packaged services in the cloud. The service model is similar to an AI-themed mall. All users can access one or more artificial intelligence services provided by the AIaaS platform through application programming interfaces.

For example, one of the artificial intelligence cloud services may be an image processing service, that is, a server in the cloud encapsulates an image processing program provided in some embodiments. The terminal calls the image processing service in the cloud service, to cause the server deployed in the cloud to perform image processing on an uploaded image, to obtain the processed image, use the processed image as a special effect image, and return the special effect image to the terminal.

In some embodiments, an exemplary image signal processing system is described by using an example in which the server and the terminal cooperatively implement the method for processing an image signal provided in some embodiments. FIG. 1 is a schematic diagram of an architecture of an image signal processing system 10 according to some embodiments. A terminal 400 is connected to a server 200 through a network 300. The network 300 may be a wide area network, a local area network, or a combination of thereof. The terminal transmits an image processing request to the server, and the server performs the method for processing an image signal according to the received image processing request.

In some embodiments, a terminal 400 displays a target image to be shared to a social network in response to an image selection operation of a user. Then the terminal 400 transmits an image processing request carrying the target image to the server 200 in response to a perspective processing operation of the user on the target image. After receiving the image processing request from the terminal 400, the server 200 processes the target image by using the method for processing an image signal provided in the embodiments to obtain the processed image, uses the processed image as a special effect image to which a perspective special effect is added, and transmits the special effect image to the terminal 400.

In some embodiments, when the method for processing an image signal is implemented by a terminal independently, the terminal displays the target image to be shared to the social network in response to the image selection operation of the user. Then, in response to the perspective processing operation of the user on the target image, the terminal processes the target image by using the method for processing an image signal provided in the embodiments to obtain the processed image, uses the processed image as a special effect image to which a perspective special effect is added, and displays the special effect image on the terminal.

In some embodiments, by using an electronic device being a terminal as an example, the terminal implements the method for processing an image signal by running a computer program. The computer program may be a native program or software module in an operating system; may be a native application (APP), that is, an image signal processing program that needs to be installed in the operating system to be run; or may be a mini program, that is, an image signal processing mini program that only needs to be downloaded to a browser environment of any client thereby being run. In summary, the foregoing computer program may be any application, module, or plug-in in any form.

The following describes a method for processing an image signal provided in some embodiments with reference to the accompanying drawings. The following description uses the terminal as the execution body of the method for processing an image signal, which can be specifically implemented by the terminal by running various computer programs above; Definitely, according to the following understanding, it is not difficult to see that the method for processing an image signal can also be implemented by the terminal and the server cooperatively.

FIG. 3A is a schematic flowchart of a method for processing an image signal according to some embodiments, and operations shown in FIG. 3A are combined for description.

In operation 101, identify a first area of object imaging in a target image from a digital image signal.

In some embodiments, the digital image signal of the target image is obtained, where the target image includes object imaging corresponding to an object. The object can be a portrait. The object imaging is the imaging of the object in the target image. The first area is an imaging area of the object in the target image. The imaging area of the identified object is an area included in an outline of the identified portrait.

As an example, the obtaining of the digital image signal of the target image may represent that an electronic device obtains the digital image signal of the target image from the outside, that is, receives the digital image signal of the target image. The obtaining of the digital image signal of the target image may also represent that the electronic device directly obtains the digital image signal of the target image locally.

In some possible examples, the identifying a first area of object imaging in a target image from a digital image signal may be implemented by an image segmentation method, such as a threshold-based segmentation method, an edge detection-based segmentation method, a ResNet-based segmentation method, an image segmentation method based on a cyclic neural network model, or the like. The following describes a process of identifying the imaging area by a fully convolutional neural network model U-Net.

First, perform down-sampling processing on the digital image signal of the target image by the U-Net to obtain image features of the target image. To obtain more valuable features, down-sampling processing is performed on the target image. In the process of down-sampling processing, a convolution operation and a pooling operation are alternately performed on the digital image signal of the target image. After each pooling operation, a resolution of a feature map corresponding to a pooling operation result (that is, image features obtained through the pooling operation) is reduced. After a last pooling operation, the convolution operation is performed on the pooling operation result, and the obtained image features are used as the image features of the target image.

Then, up-sampling processing is performed on the image features of the target image to obtain an up-sampling processing result. Because part of semantic information of the target image is lost during the down-sampling processing, and the resolution of the target image is too low, it is also necessary to fill into the information through the up-sampling processing, thereby identifying a more accurate first area. The up-sampling processing may be performed by an interpolation method or the like. After the up-sampling processing, a resolution of a feature map corresponding to the up-sampling processing result (the image features obtained through the up-sampling processing) is increased.

After that, feature fusion processing is performed on the up-sampling processing result to obtain a fused feature of the target image. The up-sampling processing result is spliced with a pooling operation result corresponding to a feature map with a same resolution, to obtain the fused feature. The part of the semantic information may be restored through feature splicing, that is, a skip connection, to ensure the accuracy of identification. The up-sampling processing and the feature fusion processing need to be alternately performed for a plurality of times, and a number of times thereof is consistent with a number of pooling operations. In a process of each feature fusion processing, a previous up-sampling processing result is spliced with a pooling operation result in a process of corresponding down-sampling processing, and feature maps respectively corresponding to the up-sampling processing result and the corresponding pooling operation result have a same resolution.

Finally, the fused feature is activated, to obtain the corresponding imaging area of the object in the target image. For example, a last fused feature may be activated by a softmax activation function to determine a first area.

The first area is identified from the digital image signal by the method for processing an image signal provided in some embodiments. The electronic device performs the down-sampling processing, which can restore key semantic information of the target image, thereby maximally restoring the integrity and accuracy of an information amount of the target image. In addition, the down-sampling processing performed by the electronic device can reduce the amount of data processing, thereby improving the image processing efficiency of the electronic device. Through the up-sampling processing of the electronic device, the information lost in the down-sampling processing can be filled, and the integrity and accuracy of the information amount of the target image can also be maximally restored. Through the fusion processing and activation processing of the electronic device, the identification accuracy of the electronic device for the first area can be improved, thereby maximally restoring the integrity and accuracy of the information amount of the target image, and image storage resources and image display resources of the electronic device are effectively utilized, thereby improving the utilization rates of the image storage resources and the image display resources.

In some possible examples, the identifying a first area of object imaging in a target image from a digital image signal may also be implemented by a bounding box regression method. The following describes the bounding box regression method.

First, determine a plurality of candidate areas in the target image based on the digital image signal of the target image, where the candidate areas may be determined by methods such as sliding windows and regular blocks, and selective searching. Then, perform a convolution operation on each candidate area in the plurality of candidate areas, thereby extracting image features of each candidate area. Then, perform classification processing on each candidate area based on the image features of each candidate area, to obtain a target candidate area whose type is the object. Classification processing may be performed on the candidate areas by a support vector machine (SVM) or softmax logistic regression to obtain types of the candidate areas, and a candidate area whose type is the object (such as the portrait) is determined as the target candidate area. Finally, perform bounding box regression processing on the target candidate area based on the image features of the target candidate areas to obtain a bounding box, and use the bounding box as a first area. Because the target candidate area may be inaccurate, such as including only part of the portrait instead of the complete portrait, or including a background portion or the like, the bounding box regression processing needs to be performed on the target candidate area to obtain the imaging area. The candidate area may be translated and zoomed by the bounding regression method, to obtain the first area.

The first area is identified from the digital image signal by the method for processing an image signal. Through the determining of the electronic device on the target candidate area, data processing objects can be reduced, thereby improving the image processing efficiency of the electronic device. Through the bounding box regression processing of the electronic device, the identification accuracy of the first area can be improved, thereby maximally restoring the integrity and accuracy of the information amount of the target image, and image storage resources and image display resources of the electronic device are effectively utilized, thereby improving the utilization rates of the image storage resources and the image display resources.

In operation 102, remove the object imaging from the target image based on the first area, to obtain a background image corresponding to an original background.

Figure 2A:
FIG. 2A is a schematic diagram of a target image according to some embodiments.
Figure 2B:
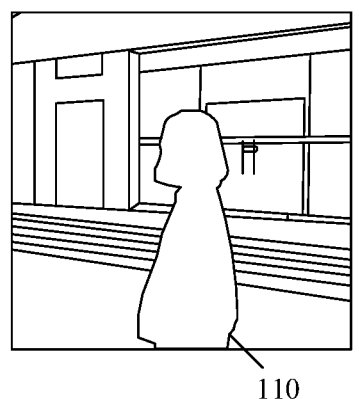
FIG. 2B is a schematic diagram of a background image according to some embodiments.

FIG. 2A is a schematic diagram of a target image according to some embodiments, and FIG. 2B is a schematic diagram of a background image according to some embodiments. After the imaging area is determined through operation 101, an image matting operation is performed on the imaging area, thereby removing the object imaging from the target image, and obtaining the background image shown in FIG. 2B.

In operation 103, perform image inpainting processing on the first area of the background image to obtain a filled image.

Figure 2C:
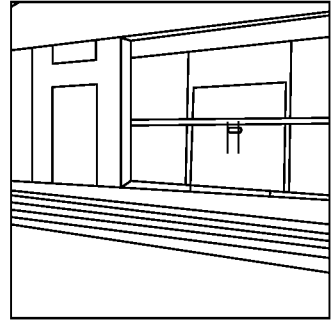
FIG. 2C is a schematic diagram of a filled image according to some embodiments.

In some embodiments, in a first area 110 shown in FIG. 2B, a perspective background connected to an original background in a background image is filled to obtain a filled image shown in FIG. 2C, where the filled image includes the original background and a perspective background connected to the original background.

In some embodiments, the perspective background connected to the original background includes at least one of the following: a perspective background whose color similarity with the original background is greater than a color similarity threshold; or a perspective background whose texture similarity with the original background is greater than a texture similarity threshold. Image inpainting requires filling in missing areas of a to-be-restored image according to the image or image library information, so that the image is difficult to be distinguished an undamaged image. Image inpainting may be realized by a texture synthesis manner. A core thereof is to sample pixel blocks from the undamaged area of the image to fill a to-be-filled area, that is, to sample pixel blocks from the background image to fill the first area. The pixel blocks include at least one of the following: pixel blocks whose color similarities with the original background are greater than the color similarity threshold; or pixel block whose texture similarities with the original background are greater than the texture similarity threshold. The filled pixel blocks form the perspective background connected to the original background.

In the technical solutions of the embodiments, by targeted sampling of an electronic device, the integrity, coordination and accuracy of an information amount of a target image are maximally restored, thereby realizing object anonymization and reducing the loss of an image information amount. In addition, by the targeted sampling of the electronic device, computing resources of the electronic device can be saved. At the same time, by the targeted sampling of the electronic device, the accuracy of filling a first area by the electronic device can be improved. Therefore, the accuracy of processing a digital image signal to realize object anonymization is also effectively improved compared with the related art.

In some embodiments, operation 103 is implemented by calling a trained neural network model. The following describes a processing process of the neural network model. The neural network model includes a plurality of convolutional layers and a plurality of deconvolution layers. The convolutional layers are configured to perform convolution processing on the background image to obtain image features of the background image. The deconvolution layers are configured to perform deconvolution processing based on the image features of the background image to obtain a filled image with a same resolution as the background image. The first area in the filled image is filled with pixel points connected to the original background.

After feature extraction is performed through a convolutional layer, the extracted features are processed by an activation function to obtain a corresponding feature map, then feature extraction is performed on the feature map through next convolutional layer, and the above operation process is repeated until a last convolutional layer, so that the image features of the background image are obtained. After that, convolution calculation is performed on the image features of the background image through the deconvolution layers, and up-sampling processing and activation processing are performed on a convolution calculation result to obtain the corresponding feature map. Through the plurality of deconvolution layers, the filled image with the same resolution as the background image are outputted.

Through the method for processing an image signal provided in some embodiments, convolution processing is performed on a background image by calling a neural network model to obtain image features of the background image, and deconvolution processing is performed on the image features of the background image to obtain a filled image with a same resolution as the background image. Through a convolution operation of an electronic device, the image features in the background image can be accurately extracted. Some edge, line, corner and other features of the background image can be extracted from a lower-level convolutional layer. A higher-level convolutional layer can learn more complex features from the lower-level convolutional layer. Through the convolution operation of the electronic device, the loss of an image information amount is reduced, thereby maximally restoring the integrity, coordination and accuracy of an information amount of a target image. Deconvolution is an inverse process of convolution. Through the deconvolution of the electronic device, image inpainting can be accurately realized, thereby obtaining the filled image with the same resolution as the background image. Moreover, because color, texture and other features of the background image are learned through the convolution processing, the accuracy of the filled image in subsequent deconvolution can be ensured, thereby reducing the loss of the image information amount, and maximally restoring the integrity, coordination and precision of the information amount of the target image. In addition, through a deconvolution operation of the electronic device on a digital image signal, the accuracy of object anonymization is improved, thereby effectively improving the image processing accuracy and image processing efficiency of the electronic device.

In some possible examples, the following describes a process of training the neural network model: obtaining a background image sample and an original image sample from a sample database, where the background image sample is formed by removing the object imaging in the original image sample; using a pixel of the original image sample as a label of the background image sample; performing filling processing on the background image sample by calling the neural network model to obtain a filled image sample, where the filling processing is to fill the first area of the background image sample with the perspective background connected to the original background in the background image sample; and finally, determine an error between a pixel of the filled image sample and the label of the background image sample, and update a parameter of the neural network model according to the error. That is, the pixel of the filled image sample and the pixel of the original image sample are substituted into a reconstruction loss function corresponding to the neural network model to obtain a corresponding reconstruction loss function value. The reconstruction loss function value is back-propagated in the neural network model to determine a corresponding gradient, and the parameter of the neural network model is updated according to the gradient. Because texture and details of image samples are represented by pixels and gray scale distribution of surrounding spatial adjacent domains thereof, the error between the pixel of the filled image sample and the label of the background image sample can reflect a difference between the filled image sample and the background image sample in terms of the texture and details, and the neural network model can be trained based on the difference.

It can be seen that, the reconstruction loss function corresponding to the above training process reflects the texture, details, and other properties of the images. Therefore, the neural network model obtained by training may be configured to fill the first area with a perspective background with a same texture as the original background in the background image, to obtain the filled image, and the imaging of the first area is difficult to be distinguished from the background image in the filled image.

Through the method for processing an image signal provided in some embodiments, a neural network model is trained to obtain the neural network model with an image inpainting capability. Because the neural network model is updated based on an error, the updated neural network model only has a lower error. Therefore, when an electronic device subsequently calls the neural network model to perform image inpainting, the loss of an image information amount is reduced, thereby maximally restoring the integrity, coordination and accuracy of an information amount of the target image. The accuracy of processing a digital image signal by the neural network model for image inpainting is also effectively improved compared with the related art. Therefore, the electronic device has higher image processing efficiency and image processing accuracy.

In some other possible examples, a generative adversarial network model may also be introduced and trained. In a training process, an input of a generator in the generative adversarial network model is the background image from which the object imaging is removed, and an output is the reconstructed filled image. An input of a discriminator is the reconstructed filled image and a real filled image. An adversarial loss function corresponding to the generative adversarial network model may reflect a structure and other properties of an image. Therefore, the adversarial loss function and the above reconstruction loss function may be combined as a total loss function, for example, different weights are assigned to the two loss functions for weighted summation, to get the total loss function. Then, the neural network model is trained based on the total loss function. In this way, the perspective background filled in the imaging area can be consistent with the original background in more dimensions such as the texture and the structure, to make the filled image more realistic and natural.

In operation 104, identify a second area in the object imaging, the second area including at least one portion of a face of the object.

In some embodiments, of the at least one portion of the face of the object may be eyes, a nose, a forehead, a mouth, eyes and the nose, the eyes and the nose and the forehead and the mouth, or the like. The identifying a second area in the object imaging may be implemented through operation 1041 to operation 1043 shown in FIG. 3B.

In operation 1041, perform positioning processing on the at least one portion of the face of the object to obtain position information of the at least one portion of the face.

In some possible examples, the positioning processing may be performed on the at least one portion of the face of the object by cascaded pose regression (CPR), Face++, a multi-task cascaded convolutional network (MTCNN) model, or the like, key points of the at least one portion of the face is detected, and position information of the key points of the at least one portion of the face is determined.

In operation 1042, determine an area in which the at least one portion of the face is located based on the position information.

For example, when the at least one portion of the face is the eyes and the nose, a minimum area including the eyes and the nose needs to be determined, and a shape of the minimum area may be a rectangle, a circle, an ellipse, a polygon, or the like.

In operation 1043, extend the area in which the at least one portion of the face is located to an edge of the object imaging, and use the extended area obtained as the second area in the object imaging.

In some embodiments, because the second area is an area on which perspective processing needs to be performed, when the minimum area determined in operation 1042 is used as the second area, it is more likely that an area outside the second area is still the object imaging. When perspective processing is performed on the second area, a "hole" connected to the original background appears in the face. For example, the second area corresponding to the eye portion displays a perspective image connected to the original background, so that the entire processed image does not have a sufficient privacy protection effect. Therefore, the area in operation 1042 needs to be extended to the edge of the object imaging, and the extended area is used as the second area on which perspective processing needs to be performed.

Through the method for processing an image signal provided in some embodiments, a second area in object imaging can be accurately identified, thereby reducing the loss of an image information amount, and maximally restoring the integrity, coordination, and accuracy of an information amount of a target image. By positioning at least one portion of a face by an electronic device, a minimum area including of the at least one portion of the face is positioned, and the second area is obtained by extending the positioned minimum area. Therefore, by only processing the effective minimum area by the electronic device, image processing resources can be saved, and by extending the minimum area, the accuracy of the second area can be ensured. Therefore, the accuracy of object anonymization realized by the electronic device can be effectively improved.

In operation 105, remove an imaging portion corresponding to the second area from the object imaging, and superimpose the obtained adjusted object imaging on the first area in the filled image to obtain a processed image.

As an example, the second area is perspective in the processed image.

Figure 2D:
FIG. 2D is a schematic diagram of new object imaging according to some embodiments.

In some embodiments, the removing imaging of the second area from the object imaging refers to performing image matting processing based on the imaging portion of the second area on the second area of the object imaging, to remove the imaging of the second area from the object imaging, and obtain the adjusted object imaging. FIG. 2D is a schematic diagram of an adjusted object imaging according to some embodiments. In a portrait imaging shown in FIG. 2D, the imaging in the second area with an ellipse is removed.

Figure 2E:
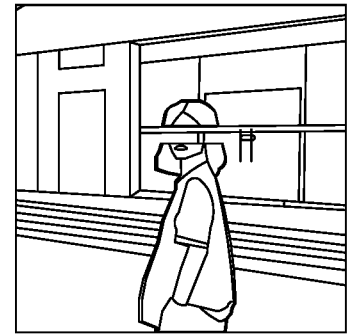
FIG. 2E is a schematic diagram of a special effect image according to some embodiments.

In some embodiments, the obtained adjusted object imaging is superimposed on the first area in the filled image to obtain the processed image, that is, each pixel point of the obtained adjusted object imaging is superimposed on the first area of the filled image to make a background of the second area of the filled image perspective, and generate the processed image based on a superimposed result. Specifically, each pixel point of the adjusted object imaging is superimposed on the first area of the filled image to obtain the processed image, where a background of the processed image in the second area is perspective. FIG. 2E is a schematic diagram of a processed image according to some embodiments. The adjusted object imaging shown in FIG. 2D is superimposed on the first area of the filled image. In this way, at the second area, the filled image is not covered by the object imaging, and remains content of the original filled image, thereby realizing the perspective effect of the second area. The first area outside the second area is covered by the adjusted object imaging, thereby forming the processed image shown in FIG. 2E. In some possible examples, when the second area is a rectangle, a processed image shown in FIG. 2F can be obtained.

Through the method for processing an image signal according to some embodiments, an adjusted object imaging can be obtained, and then a processed image can be obtained based on superimposing processing. Therefore, the accuracy of processing a digital image signal to realize object anonymization is also effectively improved compared with the related art. By only performing image matting processing based on an imaging portion by an electronic device, not only image processing resources are saved, but also the image processing accuracy is improved, thereby effectively improving the image processing efficiency and resource utilization of the electronic device. Moreover, the adjusted object imaging maximally restores image information of an object. In this way, when the facial privacy protection of the image is realized so that object anonymization is realized, the loss of an image information amount is reduced, thereby maximally restoring the integrity, coordination, and accuracy of an information amount of a target image.

It can be seen that, in some embodiments, a second area in which at least one portion of a face of an object of a target image is positioned, an imaging portion corresponding to the second area is removed from object imaging, the obtained adjusted object imaging is superimposed on a filled image obtained by filling processing to obtain a processed image, and the at least one portion of the face of the object is replaced with a perspective background connected to an original background. In this way, when the facial privacy protection of the image is realized so that object anonymization is realized, the loss of an image information amount is reduced, thereby maximally restoring the integrity, coordination, and accuracy of an information amount of the target image. Moreover, pixel units corresponding to the at least one portion of the face of the object are continuously used for displaying image information after completing the foregoing replacement, so that image storage resources and image display resources of an electronic device are effectively utilized, thereby improving the utilization rates of the image storage resources and the image display resources. In addition, the method of some embodiments can also superimpose the obtained adjusted object imaging on the filled image obtained by filling processing through the electronic device. Therefore, the accuracy of processing a digital image signal to realize object anonymization is also effectively improved compared with the related art.

FIG. 3C is a schematic flowchart of a method for processing an image signal according to some embodiments. A process in which the method for processing an image signal provided in some embodiments is implemented by a terminal is described with reference to operations shown in FIG. 3C.

In operation 201, display a target image to be shared to a social network in response to an image selection operation.

Figure 2F:
FIG. 2F is a schematic diagram of a special effect image according to some embodiments.
Figure 2G:
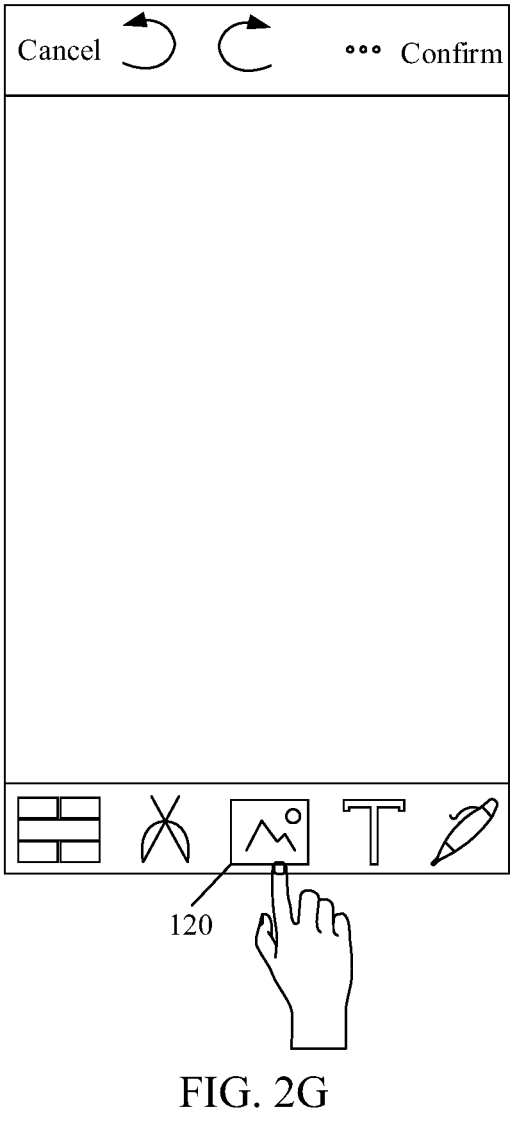
FIG. 2G is a schematic diagram of a page for uploading an image according to some embodiments.

FIG. 2G is a schematic diagram of a page for uploading an image according to some embodiments. A user may click an icon 120 at the bottom of the page shown in FIG. 2G, and select the target image to upload to a social application. In response to an image selection operation of the user, the terminal displays the target image to be shared to the social network uploaded by the user in an editing page shown in FIG. 2H.

Figure 2H:
FIG. 2H is a schematic diagram of an editing page according to some embodiments.
Figure 2I:
FIG. 2I is a schematic diagram of a to-be-cropped area according to some embodiments.
Figure 2J:
FIG. 2J is a schematic diagram of an updated target image according to some embodiments.

In some embodiments, after operation 201, the user clicks an icon 130 at the bottom of the page shown in FIG. 2H to crop the target image. In response to a cropping operation on the target image the terminal determines a to-be-cropped area, such as a portion of the target image below a dotted line in FIG. 2I. Then, the terminal removes imaging outside the to-be-cropped area from the target image to obtain an updated target image, as shown in FIG. 2J, and finally, displays the updated target image.

The target image is cropped by using the method for processing an image signal provided in some embodiments to obtain an updated target image. Through some embodiments, when the facial privacy protection of the image is realized so that object anonymization is realized, the loss of an image information amount is reduced, thereby maximally restoring the integrity, coordination, and accuracy the target image. Moreover, an electronic device only needs to perform the method for processing an image signal for an updated target image, so that image storage resources and image display resources of the electronic device are effectively utilized, thereby improving the utilization rates of the image storage resources and the image display resources.

In operation 202, obtain a processed image in response to the perspective processing operation on the target image, and display the processed image, the processed image being formed by performing perspective processing on at least one portion of a face in the target image, and a perspective background of the at least one portion of the face being connected to an original background of the target image.

Figures 2K, 2L:
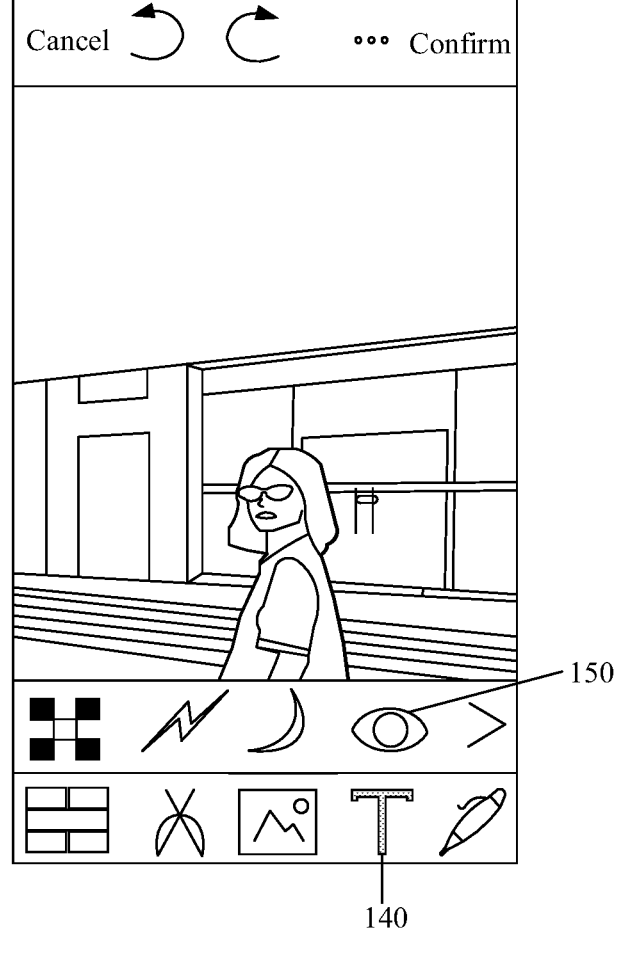
FIG. 2K is a schematic diagram of a special effect selection page according to some embodiments.
FIG. 2L is a schematic diagram of a target area for perspective selection according to some embodiments.

In some embodiments, the terminal first displays a plurality of candidate processing manners applied to the target image in response to a trigger operation on a processing entry. The processing entry can be a special effect entry. The candidate processing manners may be special effect processing. the perspective processing manner is one of the plurality of candidate processing manners, and the processing entry may be an icon, text, a floating window, or the like. For example, in response to a trigger operation of the user on an icon 140 (that is, the special effect entry) in FIG. 2H, a processing manner selection page (such as a special effect selection page) shown in FIG. 2K is displayed. In the processing manner selection page, the icon 140 is highlighted, and a plurality of candidate processing manners, such as mosaic processing, pattern covering processing, and perspective processing (such as a perspective special effect 150), are displayed side by side above the icon 140. In some embodiments, when the user selects the perspective special effect 150, the perspective processing is performed on the face portion of the target image by default. Therefore, in response to the perspective processing operation on the target image refers to, in response to a selection operation on a perspective special effect of the face portion. Then, the terminal transmits an image processing request carrying the target image to a server, where the image processing request is used for requesting the server to perform perspective processing on the at least one portion of the face of the target image, that is, adding the perspective special effect. After receiving the image processing request, as described above, the server processes the target image through operation 101 to operation 105 to obtain the processed image (for example, a special effect image), and transmits the processed image to the terminal, so the terminal obtains a processed image (as shown in FIG. 2E or FIG. 2F) formed by performing perspective processing on the at least one portion of the face in the target image, and displays the processed image.

Through the method for processing an image signal provided in some embodiments, a human-computer interaction function is provided for a user. A plurality of candidate processing manners applied to the target image are displayed in response to a trigger operation on a processing entry. The user can select an image processing manner independently. A processed image is obtained in response to a selection operation on a perspective processing manner for a face, and the processed image is displayed. The user can independently trigger and start a specific image processing process, and perform the image processing process, thereby improving the human-computer interaction efficiency of the user. Because the human-computer interaction efficiency is effectively improved, the utilization rate of computing resources of the electronic device can be improved.

In some embodiments, when the user selects the perspective processing manner, perspective processing is not performed on the face portion of the target image by default. In this case, the user can slide or click on the face of the target image to select a second area on which perspective processing needs to be performed. FIG. 2L is a schematic diagram of a second area for perspective selection according to some embodiments. A dotted line in FIG. 2L is a sliding track of a finger, that is, the second area selected by the user on which perspective processing needs to be performed. In response to a selection operation on the at least one portion of the face of the target image, the terminal performs perspective processing on the at least one portion of the face in the target image to generate the processed image. In some possible examples, the user may also select to perform perspective processing on other parts outside the face, such as portions of clothing, shoes, or the like.

Through the method for processing an image signal provided in some embodiments, a human-computer interaction function is provided for a user. In response to a selection operation on at least one portion of a face of a target image, perspective processing is performed on the at least one portion of the face in the target image to obtain a processed image. The user can select a perspective object independently, thereby improving the human-computer interaction efficiency. Because the human-computer interaction efficiency is effectively improved, the utilization rate of computing resources of the electronic device can be improved.

In operation 203, transmit the processed image to the social network in response to a sharing operation on the processed image.

In some embodiments, the user can share the processed image to the social network through a sharing operation such as clicking the processed image, long-pressing the processed image, or clicking a share button in the processed image.

It can be seen that, in some embodiments, a processed image formed by performing perspective processing on one portion of a target image can be obtained, and the processed image can be displayed. The perspective portion is connected to a background of the target image. Therefore, when the facial privacy protection of the image is realized so that object anonymization is realized, the loss of an image information amount is reduced, thereby maximally restoring the integrity, coordination, and accuracy of an information amount of the target image. Moreover, pixel units corresponding to the at least one portion of the face of the object are continuously used for displaying image information after completing the foregoing replacement, so that image storage resources and image display resources of an electronic device are effectively utilized, thereby improving the utilization rates of the image storage resources and the image display resources.

The following describes an example embodiment in a detailed application scenario.

In a social application, when a user needs to share a dressing tutorial, such as share a clothing image of the user, and needs to add a perspective special effect to a face in the clothing image, that is, needs to perform image processing on the face to block the face for privacy protection, the clothing image uploaded by the user is received, and the uploaded clothing image is cropped to obtain a target image. Then, in response to a selection operation of selecting "a perspective face" in a sticker panel page (processing manner selection page), "the perspective face" is one of a plurality of candidate processing manners, and is also a special effect in a plurality of candidate special effects.

In response to the selection operation of the user on a perspective special effect (that is, the "perspective face"), a terminal calls an artificial intelligence (AI) interface to perform image processing on the target image, and returns a processed image (a special effect image) to the terminal. A process of processing the target image to obtain the special effect image may be realized by implementing the image processing method provided in some embodiments. FIG. 4 is a schematic flowchart of perspective processing according to some embodiments. First, key points of the face in the target image are detected, that is, eyes and a nose in facial features are positioned, and position information of the eyes and the nose in the target image are obtained.

Then, to perform object segmentation, a complete outline of a portrait in the target image is identified by using an object segmentation technology, and the complete outline is cut out from the target image, and finally a background image from which the portrait is removed is obtained, as shown in FIG. 2B. Then, a convolutional neural network model for image inpainting is used to restore and fill the background image (that is, perform background filling), and image content naturally connected to the background is generated in a target area in the portrait is missing, to obtain a filled image, as shown in FIG. 2C. An input of the convolutional neural network model for image inpainting is an image with a missing portion, and the convolutional neural network model can automatically learn a texture feature according to other portions of an image background, perform pixel filling on a first area of the missing portrait, and finally output a complete image. When the convolutional neural network model for image inpainting is trained, a used training sample is a background image sample from which the portrait is removed, and a label is a complete target image sample. In this way, the convolutional neural network model can better learn a capability of cutting out an object and performing background filling on the first area again.

Figure 2M:
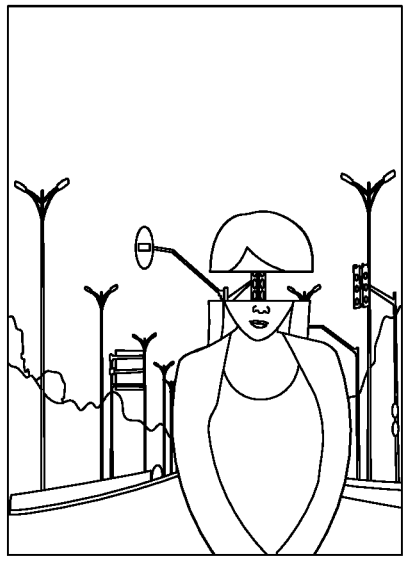
FIG. 2M is a schematic diagram of a special effect image according to some embodiments.
Figure 2N:
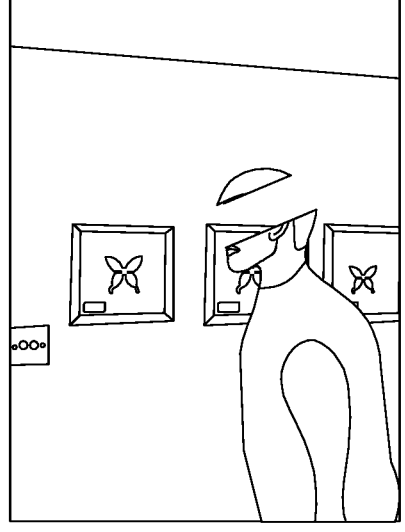
FIG. 2N is a schematic diagram of a special effect image according to some embodiments.

Finally, according to the position information of the eyes and the nose, a minimum rectangle covering the eyes and the nose is generated in the filled image, and is extended horizontally to a boundary of the second area, to generate a rectangular strip-shaped perspective area. The cut-out portrait from which the rectangular strip-shaped perspective area is removed is filled into the filled image to obtain a processed image, as shown in FIG. 2E and FIG. 2F, and the processed image is returned to the terminal for display. In some possible examples, the processed image may also be shown in FIG. 2M or FIG. 2N. After the terminal obtains and displays the processed image, the user may share the processed image to the social network by clicking a share button in the processed image or another operation. In this way, the user's personal privacy is protected during sharing, the accuracy of protecting the user's personal information is improved, and the information loss of image processing and image sharing is reduced, thereby improving the image processing accuracy and the image processing efficiency of an electronic device.

The facial features (such as the eyes and the nose) may be positioned through a 68 face key point detection technology of OpenCV and various face key point detection technologies based on convolutional neural network models. Object segmentation may be performed through various object segmentation technologies based on a convolutional neural network model (such as a U-Net) and an encoder-decoder. The background image may also be inpainted and filled through an image filling network model or an inpainting network model having another structure, such as a generative adversarial network model. A larger area including a forehead or a mouth may also be selected as the rectangular strip-shaped perspective area, and a shape of the perspective area is not limited to the rectangular strip shape, and may be another shape such as an ellipse.

It can be seen that, in some embodiments, a complete outline of a portrait in a target image is identified, and is cut out from the target image. Then, through a convolutional neural network model for image inpainting, a background image from which the portrait is cut out is inpainted and filled, and image content naturally connected to a background is generated in the first area in which an original portrait is located, to obtain a filled image. Finally, the cut-out portrait outside a perspective area is superimposed on the filled image to obtain a processed image. In this way, not only the environment where face covering matches social networking in a social application is maintained, but also face blocking manners (blocking a face through perspective processing) are innovated, so that a new image processing function is provided for a user, the accuracy of protecting the user's personal information is improved, and the information loss of image processing and image sharing is reduced, thereby improving the image processing accuracy and the image processing efficiency of an electronic device.

The electronic device implementing some embodiments is the server 200 shown in FIG. 1 as an example to illustrate the structure of the electronic device provided in some embodiments. FIG. 5A is a schematic structural diagram of a server 200 according to some embodiments. The server 200 shown in FIG. 5A includes: at least one processor 210, a memory 240, at least one network interface 220. Components in the server 200 are coupled together by using a bus system 230. It may be understood that, the bus system 230 is configured to implement connection and communication between the components. In addition to a data bus, the bus system 230 further includes a power bus, a control bus, and a state signal bus. However, for clear description, various types of buses in FIG. 5A are marked as the bus system 230.

The processor 210 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The memory 240 may be a removable memory, a non-removable memory, or a combination thereof. Exemplary hardware devices include a solid-state memory, a hard disk drive, an optical disc driver, and the like. The memory 240 may include one or more storage devices physically remote from the processor 210.

The memory 240 includes a volatile memory or a non-volatile memory, or may include both the volatile memory and the non-volatile memory. The non-volatile memory may be a read-only memory (ROM). The volatile memory may be a random access memory (RAM). The memory 240 described in some embodiments is to include any other suitable type of memories.

In some embodiments, the memory 240 may store data to support various operations. Examples of the data include a program, a module, and a data structure, or a subset or a superset thereof, which are described below by using examples.

An operating system 241 includes a system program configured to process various basic system services and perform a hardware-related task, for example, a framework layer, a core library layer, and a driver layer, and is configured to implement various basic services and process a hardware-based task;

A network communication module 242 is configured to reach another computing device through one or more (wired or wireless) network interfaces 220. Exemplary network interfaces 220 include: Bluetooth, wireless compatible authentication (Wi-Fi), a universal serial bus (USB), or the like;

In some embodiments, an apparatus for processing an image signal may be implemented in the form of software. FIG. 5A shows an apparatus 243 for processing an image signal that is stored in the memory 240, which may be software in the form of a program, a plug-in, or the like, and includes the following software modules: an identification module 2431, a filling module 2432, and a training module 2433. The modules are logical, so that any combination or further division can be implemented according to implemented functions. The following describes the functions of the modules.

The identification module 2431 is configured to obtain a digital image signal of a target image, the target image including object imaging corresponding to an object; identify a first area of the object imaging in the target image from the digital image signal; remove the object imaging from the target image based on the first area, to obtain a background image corresponding to the original background; and identify a second area in the object imaging, the second area including at least one portion of a face of the object. The filling module 2432 is configured to perform image inpainting processing on the first area of the background image to obtain a filled image, the filled image including the original background and a perspective background connected to the original background; and remove an imaging portion corresponding to the second area from the object imaging, and fill the obtained adjusted object imaging into the first area in the filled image to obtain a processed image, the second area being perspective in the processed image.

In some embodiments, the identification module 2431 is further configured to perform down-sampling processing on the digital image signal of the target image to obtain image features of the target image; perform up-sampling processing on the image feature of the target image to obtain an up-sampling processing result, and perform feature fusion processing on the up-sampling processing result to obtain a fused feature of the target image; and activate the fused feature to obtain the first area of the object in the target image.

In some embodiments, the identification module 2431 is further configured to determine a plurality of candidate areas in the target image based on the digital image signal of the target image, and extract image features of each of the candidate areas; perform classification processing on each of the candidate areas based on the image features of each of the candidate areas, to obtain a target candidate area whose type is the object; and perform bounding box regression processing on the target candidate area based on the image features of the target candidate area to obtain a bounding box, and use the bounding box as the first area.

In some embodiments, the filling module 2432 is further configured to perform convolution processing on the background image by calling the neural network model to obtain image features of the background image; and perform deconvolution processing on the image features of the background image to obtain a filled image with a same resolution as the background image, where the first area in the filled image is filled with pixel points matching the original background.

In some embodiments, the training module 2433 is configured to obtain a background image sample and an original image sample from a sample database, where the background image sample is formed by removing the object imaging in the original image sample; use a pixel of the original image sample as a label of the background image sample; perform filling processing on the background image sample by calling the neural network model to obtain a filled image sample; and determine an error between a pixel of the filled image sample and the label of the background image sample, and update a parameter of the neural network model according to the error.

In some embodiments, the identification module 2431 is further configured to perform positioning processing on the at least one portion of the face of the object to obtain position information of the at least one portion of the face; determine an area in which the at least one portion of the face is located based on the position information; and extend the area in which the at least one portion of the face is located to an edge of the object imaging, and used the extended area as the second area in the object imaging.

In some embodiments, the filling module 2432 is further configured to perform image matting processing based on the imaging portion of the second area on the second area of the object imaging to obtain the adjusted object imaging; and superimpose each pixel point of the adjusted object imaging on the first area of the filled image to obtain the processed image, where a background of the processed image in the second area is perspective.

Figure 5B:
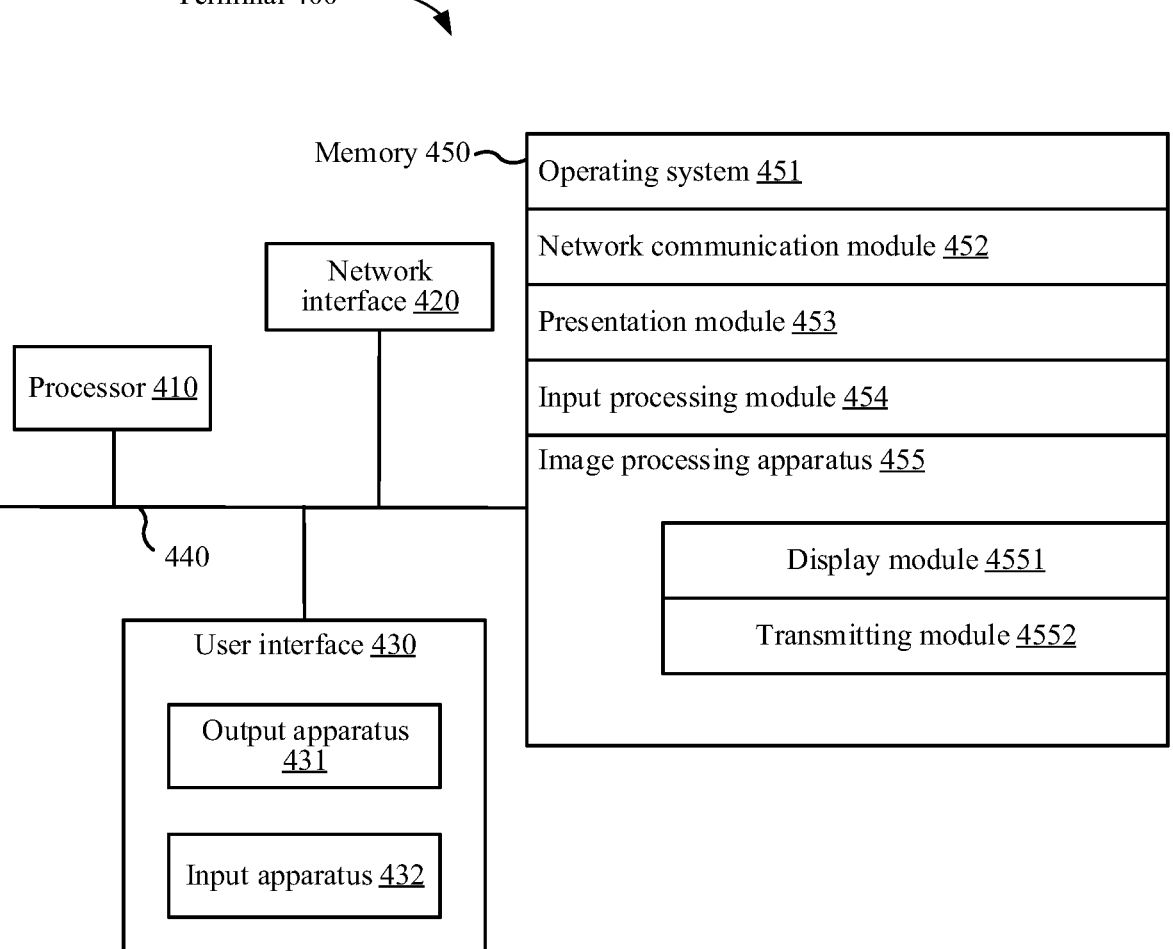
FIG. 5B is a schematic structural diagram of a terminal 400 according to some embodiments.

By using an example in which an electronic device is a terminal 400 shown in FIG. 1, a structure of the electronic device provided in some embodiments is illustrated. FIG. 5B is a schematic structural diagram of a terminal 400 according to some embodiments. The terminal 400 shown in FIG. 5B includes: at least one processor 410, a memory 440, at least one network interface 420, and a user interface 430. Components in the terminal 400 are coupled together by using a bus system 440. The user interface 430 includes one or more output apparatuses 431 that present media content, and further includes one or more input apparatuses 432.

In some embodiments, the memory includes an operating system 451, a network communication module 452, a presentation module 453, and an input processing module 454. An apparatus 455 for processing an image signal provided in some embodiments may be implemented in the form of software. FIG. 5B shows the apparatus 455 for processing an image signal that is stored in the memory 450, which may be software in the form of a program, a plug-in, or the like, and includes the following software modules: a display module 4551 and a transmitting module 4552. The modules are logical, so that any combination or further division can be implemented according to implemented functions. Definitely, the apparatus 455 for processing an image signal provided in some embodiments may also be implemented in a hardware manner, and details are not described herein in some embodiments. The following describes the functions of the modules.

The display module 4551 is configured to display a target image to be shared to a social network in response to the image selection operation; and obtain a processed image in response to a perspective processing operation on the target image, and display the processed image, the processed image being formed by performing perspective processing on at least one portion of a face in the target image, and a perspective background of the at least one portion of the face being connected to an original background of the target image. The transmitting module 4552 is configured to transmit the processed image to the social network in response to a sharing operation on the processed image.

In some embodiments, the display module 4551 is further configured to determine a to-be-cropped area in response to a cropping operation on the target image; remove imaging outside the to-be-cropped area from the target image to obtain an updated target image; and display the updated target image.

In some embodiments, the display module 4551 is further configured to display a plurality of candidate processing manners applied to the target image in response to a trigger operation on a processing entry; and obtain the processed image in response to a selection operation on a perspective processing manner for the face, and display the processed image, where the perspective processing manner is one of the plurality of candidate processing manners.

In some embodiments, the displaying module 4551 is further configured to perform, in response to the selection operation on at least one portion of the face of the target image, perspective processing on the at least one portion of the face in the target image to obtain the processed image.

Some embodiments provide a computer-readable storage medium storing executable instructions, the executable instructions, when executed by a processor, causing the processor to perform the method for processing an image signal in some embodiments, for example, the method for processing an image signal provided in FIG. 3A.

Some embodiments provides a computer program product or a computer program, including computer instructions, the computer instructions being stored in a computer-readable storage medium. A processor of a computer device reads the computer instructions from the computer-readable storage medium, and executes the computer instructions, to cause the computer device to perform the above artificial intelligence-based method for processing an image signal in some embodiments.

In some embodiments, the computer-readable storage medium may be a memory such as an FRAM, a ROM, a PROM, an EPROM, an EEPROM, a flash memory, a magnetic surface memory, an optical disk, or a CD-ROM; or may be any device including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

In summary, in some embodiments, a second area in which at least one portion of a face of an object of a target image is positioned, an imaging portion corresponding to the second area is removed from object imaging, the obtained adjusted object imaging is superimposed on a filled image obtained by filling processing to obtain a processed image, and the at least one portion of the face of the object is replaced with a perspective background connected to an original background. In this way, when the facial privacy protection of the image is realized so that object anonymization is realized, the loss of an image information amount is reduced, thereby maximally restoring the integrity, coordination, and accuracy of an information amount of the target image. Therefore, image storage resources and image display resources of an electronic device are effectively utilized, thereby improving the utilization rates of the image storage resources and the image display resources. Because the obtained adjusted object imaging is superimposed on the filled image obtained by filling processing through the electronic device in some embodiments, the accuracy of processing a digital image signal by the electronic device to realize object anonymization is also effectively improved compared with the related art.

The foregoing descriptions are merely embodiments of the disclosure and are not intended to limit the protection scope of the disclosure. Any modification, equivalent replacement, or improvement made without departing from the spirit and range of the disclosure shall fall within the protection scope of the disclosure.

What is claimed is:

1. A method for processing an image signal, performed by an electronic device, the method comprising:
   obtaining a digital image signal of a target image, the target image comprising object imaging corresponding to an object;
   identifying a first area of the object imaging in the target image from the digital image signal;
   performing a first removing process by removing the object imaging from the target image based on the first area, to obtain a background image corresponding to an original background;
   performing image inpainting processing on the first area of the background image to obtain a filled image, the filled image comprising the original background and a perspective background connected to the original background;
   identifying a second area in the object imaging, the second area comprising at least one portion of a face of the object, the second area corresponding to a portion of the first area;
   performing, after performing the first removing process, a second removing process by removing an imaging portion corresponding to the second area from the object imaging to generate an adjusted object imaging in which the second area is removed; and
   superimposing the adjusted object imaging on the first area in the filled image to obtain a processed image of the target image, the second area being perspective in the processed image in which the second area is removed and the filled image is displayed in the second area.

2. The method according to claim 1, wherein the identifying the first area comprises:
   performing down-sampling processing on the digital image signal of the target image to obtain image features of the target image;
   performing up-sampling processing on the image features of the target image to obtain an up-sampling processing result, and performing feature fusion processing on the up-sampling processing result to obtain a fused feature of the target image; and
   activating the fused feature to obtain the first area of the object in the target image.

3. The method according to claim 1, wherein the identifying the first area comprises:

determining a plurality of candidate areas in the target image based on the digital image signal of the target image, and extracting image features of each of the candidate areas;

performing classification processing on each of the candidate areas based on the image features of each of the candidate areas, to obtain a target candidate area whose type is the object; and performing bounding box regression processing on the target candidate area based on the image features of the target candidate area to obtain a bounding box, and using the bounding box as the first area.

4. The method according to claim 1, wherein the performing comprises:

performing convolution processing on the background image by calling a neural network model to obtain image features of the background image; and performing deconvolution processing on the image features of the background image to obtain a filled image with a same resolution as the background image, wherein the first area in the filled image is filled with pixel points matching the original background.

5. The method according to claim 4, wherein before the identifying the first area, the method further comprises:

obtaining a background image sample and an original image sample from a sample database, wherein the background image sample is formed by removing the object imaging in the original image sample;

using a pixel of the original image sample as a label of the background image sample;

performing filling processing on the background image sample by calling the neural network model to obtain a filled image sample; and determining an error between a pixel of the filled image sample and the label of the background image sample, and updating a parameter of the neural network model according to the error.

6. The method according to claim 1, wherein the identifying the second area comprises:

performing positioning processing on the at least one portion of the face of the object to obtain position information of the at least one portion of the face;

determining an area in which the at least one portion of the face is located based on the position information; and extending the area in which the at least one portion of the face is located to an edge of the object imaging, and using the extended area as the second area in the object imaging.

7. The method according to claim 1, wherein the removing comprises:

performing image matting processing based on the imaging portion of the second area on the second area of the object imaging to generate the adjusted object imaging; and the superimposing comprises:

superimposing each pixel point of the adjusted object imaging on the first area of the filled image to obtain the processed image, wherein a background of the processed image in the second area is perspective.

8. The method according to claim 1, wherein the performing comprises:

sampling a plurality of pixel blocks from the background image, and filling the first area with the plurality of sampled pixel blocks, wherein the pixel blocks comprise at least one of the following: pixel blocks whose color similarities with the original background are greater than a color similarity threshold; or pixel blocks whose texture similarities with the original background are greater than a texture similarity threshold.

9. An apparatus for processing an image signal, comprising:

at least one memory configured to store program code; and at least one processor configured to read the program code and operate as instructed by the program code, the program code comprising:

identification code configured to cause the at least one processor to obtain a digital image signal of a target image, the target image comprising object imaging corresponding to an object, identify a first area of the object imaging in the target image from the digital image signal, remove the object imaging from the target image based on the first area, to obtain a background image corresponding to the original background, and identify a second area in the object imaging, the second area comprising at least one portion of a face of the object, the second area corresponding to a portion of the first area; and filling code configured to cause the at least one processor to perform image inpainting processing on the first area of the background image to obtain a filled image, the filled image comprising the original background and a perspective background connected to the original background, and remove, after the object imaging is removed, an imaging portion corresponding to the second area from the object imaging to generate an adjusted object imagining in which the second area is removed, and superimpose the adjusted object imaging into the first area in the filled image to obtain a processed image of the target image, the second area being perspective in the processed image in which the second area is removed and the filled image is displayed in the second area.

10. The apparatus according to claim 9, wherein the identification code is further configured to cause the at least one to:

perform down-sampling processing on the digital image signal of the target image to obtain image features of the target image;

perform up-sampling processing on the image features of the target image to obtain an up-sampling processing result, and perform feature fusion processing on the up-sampling processing result to obtain a fused feature of the target image; and activate the fused feature to obtain the first area of the object in the target image.

11. The apparatus according to claim 9, wherein the identification code is further configured to cause the at least one processor to:

determine a plurality of candidate areas in the target image based on the digital image signal of the target image, and extract image features of each of the candidate areas;

perform classification processing on each of the candidate areas based on the image features of each of the candidate areas to obtain a target candidate area whose type is the object; and perform bounding box regression processing on the target candidate area based on the image features of the target candidate area to obtain a bounding box, and use the bounding box as the first area.

12. The apparatus according to claim 9, wherein the filling code is further configured to cause the at least one processor to:

perform convolution processing on the background image by calling a neural network model to obtain image features of the background image; and perform deconvolution processing on the image features of the background image to obtain a filled image with a same resolution as the background image, where the first area in the filled image is filled with pixel points matching the original background.

13. The apparatus according to claim 12, wherein the program code further comprises training code configured to cause the at least one processor to:

obtain a background image sample and an original image sample from a sample database, where the background image sample is formed by removing the object imaging in the original image sample;

use a pixel of the original image sample as a label of the background image sample;

perform filling processing on the background image sample by calling the neural network model to obtain a filled image sample; and determine an error between a pixel of the filled image sample and the label of the background image sample, and update a parameter of the neural network model according to the error.

14. The apparatus according to claim 9, wherein the identification code is further configured to cause the at least one processor:

perform positioning processing on the at least one portion of the face of the object to obtain position information of the at least one portion of the face;

determine an area in which the at least one portion of the face is located based on the position information; and extend the area in which the at least one portion of the face is located to an edge of the object imaging, and use the extended area as the second area in the object imaging.

15. The apparatus according to claim 9, wherein the filling code is further configured to cause the at least one processor to:

perform image matting processing based on the imaging portion of the second area on the second area of the object imaging to obtain the adjusted object imaging; and superimpose each pixel point of the adjusted object imaging on the first area of the filled image to obtain the processed image, wherein a background of the processed image in the second area is perspective.

16. The apparatus according to claim 9, wherein the filling code is further configured to cause the at least one processor to:

sample a plurality of pixel blocks from the background image, and fill the first area with the plurality of sampled pixel blocks, where the pixel blocks comprise at least one of the following: pixel blocks whose color similarities with the original background are greater than a color similarity threshold; or pixel blocks whose texture similarities with the original background are greater than a texture similarity threshold.

17. A non-transitory computer-readable storage medium, storing computer code that when executed by at least one processor causes the at least one processor to executed a method comprising:

obtaining a digital image signal of a target image, the target image comprising object imaging corresponding to an object;

identifying a first area of the object imaging in the target image from the digital image signal;

performing a first removing process by removing the object imaging from the target image based on the first area to obtain a background image corresponding to an original background;

performing image inpainting processing on the first area of the background image to obtain a filled image, the filled image comprising the original background and a perspective background connected to the original background;

identifying a second area in the object imaging, the second area comprising at least one portion of a face of the object, the second area corresponding to a portion of the first area;

performing, after performing the first removing process, a second removing process by removing an imaging portion corresponding to the second area from the object imaging; and superimposing the adjusted object imaging on the first area in the filled image to obtain a processed image of the target image, the second area being perspective in the processed image in which the second area is removed and the filled image is displayed in the second area.

18. The non-transitory computer-readable storage medium according to claim 17, wherein the identifying the first area comprises:

performing down-sampling processing on the digital image signal of the target image to obtain image features of the target image;

performing up-sampling processing on the image features of the target image to obtain an up-sampling processing result, and performing feature fusion processing on the up-sampling processing result to obtain a fused feature of the target image; and activating the fused feature to obtain the first area of the object in the target image.

19. The non-transitory computer-readable storage medium according to claim 17, wherein the identifying the first area comprises:

determining a plurality of candidate areas in the target image based on the digital image signal of the target image, and extracting image features of each of the candidate areas;

performing classification processing on each of the candidate areas based on the image features of each of the candidate areas, to obtain a target candidate area whose type is the object; and performing bounding box regression processing on the target candidate area based on the image features of the target candidate area to obtain a bounding box, and using the bounding box as the first area.

20. The non-transitory computer-readable storage medium according to claim 17, wherein the performing comprises:

performing convolution processing on the background image by calling a neural network model to obtain image features of the background image; and performing deconvolution processing on the image features of the background image to obtain a filled image with a same resolution as the background image, where the first area in the filled image is filled with pixel points matching the original background.

* * * * *